United States Patent [19]
Budris et al.

[11] Patent Number: 5,156,535
[45] Date of Patent: Oct. 20, 1992

[54] HIGH SPEED WHIRLPOOL PUMP

[75] Inventors: Allan R. Budris, Parsippany; William D. Hessler, Wyckoff; Ramesh M. Patel, Ringwood; Shmariahu Yedidiah, West Orange, all of N.J.

[73] Assignee: ITT Corporation, New York, N.Y.

[21] Appl. No.: 607,179

[22] Filed: Oct. 31, 1990

[51] Int. Cl.$^5$ .............. F04D 1/00; F04D 29/10; F04D 29/24; F04D 29/44
[52] U.S. Cl. .................. 417/423.7; 277/96.2; 415/119; 415/172.1; 415/206; 415/231; 416/185; 417/423.11; 417/423.8
[58] Field of Search ............. 417/423.1, 423.7, 423.8, 417/423.11, 423.14; 416/183, 184, 185, 186 R; 415/172.1, 228, 206, 119, 231; 277/96.2

[56] References Cited

U.S. PATENT DOCUMENTS

| | | | |
|---|---|---|---|
| 3,013,501 | 12/1961 | Ygge | 415/228 X |
| 3,017,071 | 1/1962 | Lejk et al. | 415/231 X |
| 3,272,129 | 9/1966 | Leopold | 416/183 X |
| 3,478,689 | 11/1969 | Ball | 417/423.11 X |
| 3,594,102 | 7/1971 | Oden | 417/423.11 |
| 3,644,067 | 2/1972 | Yowell | 417/423.11 X |
| 3,652,183 | 3/1972 | Pottharst, Jr. | 277/96.2 X |
| 3,914,072 | 10/1975 | Rowley et al. | 417/423.11 |
| 4,195,473 | 4/1980 | Aspinwall | 416/183 X |
| 4,597,717 | 7/1986 | Mohr | 417/265 |
| 4,647,271 | 3/1987 | Nagai | 416/186 R |
| 4,759,272 | 7/1988 | Zaniewski | 416/185 |
| 4,776,598 | 10/1988 | Akema | 277/96.2 |
| 4,998,865 | 3/1991 | Nakanishi | 417/423.146 |

FOREIGN PATENT DOCUMENTS

| | | | |
|---|---|---|---|
| 1075435 | 2/1960 | Fed. Rep. of Germany | 417/423.11 |
| 503046 | 2/1976 | U.S.S.R. | 416/185 |

Primary Examiner—Leonard E. Smith
Attorney, Agent, or Firm—Menotti J. Lombardi

[57] ABSTRACT

A pump for Whirlpool and Spa applications has a series wound universal motor which is directly coupled to a centrifugal impeller for operation in the range of 4000 to 9000 RPM. Variable speed of the pump is easily accomplished with a universal motor by varying the voltage to the motor.

16 Claims, 4 Drawing Sheets

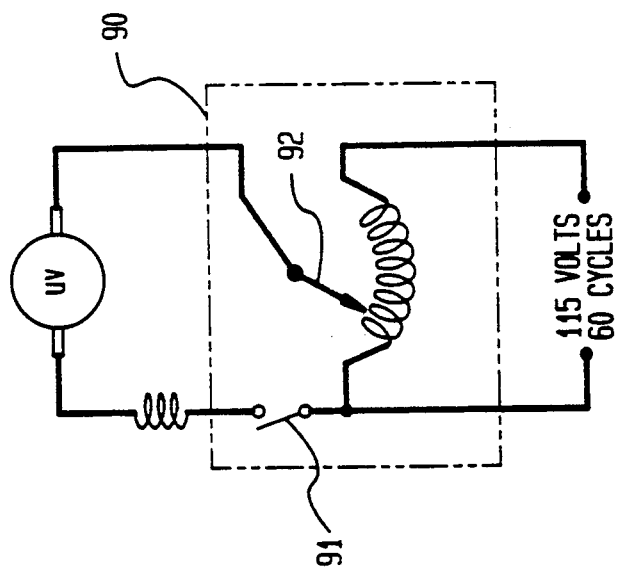
FIG. 5
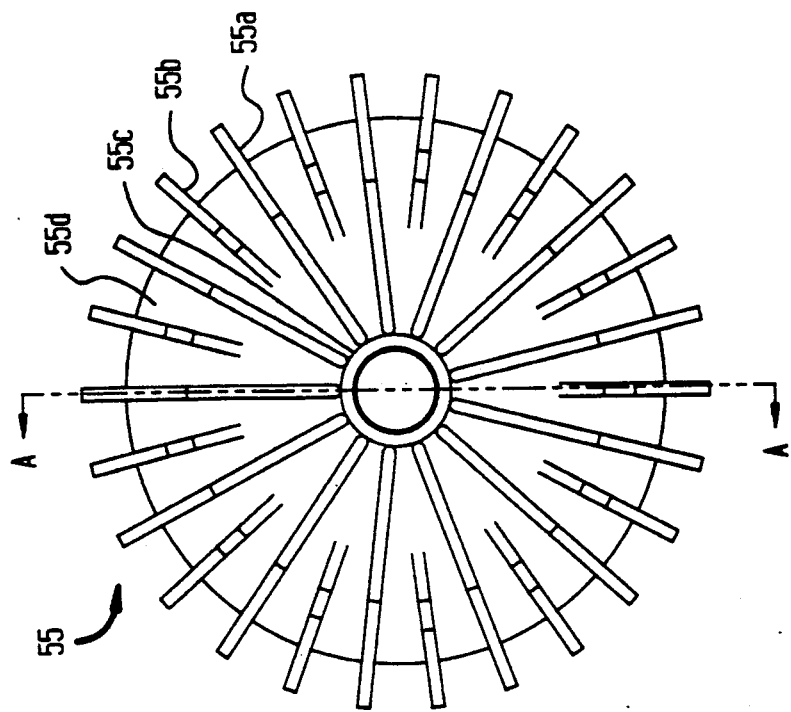
FIG. 3A
FIG. 3

HIGH SPEED WHIRLPOOL PUMP

BACKGROUND OF THE INVENTION

This invention relates to high speed pumps, and more particularly to high speed pumps for Whirlpool and Spa applications.

Other similar devices primarily fall into five categories:
  a. Close coupled end suction (non-self draining), low speed pump on single speed, A.C. induction motor.
  b. Close coupled end suction, self-draining, low speed pump on single speed, A.C. induction motor.
  C. Close coupled end suction (non-self draining), low speed pump on two speed, A.C. induction motor.
  d. Close coupled end suction, self-draining, low speed pump on variable speed, variable frequency induction motor.
  e. Belt driven, low speed submersible pump powered by high speed series wound universal motor (portable Whirlpool units only).

All of the above categories of Whirlpool pumps, provide flow and pressure to the liquid to be circulated in the normal manner consistent with single stage centrifugal, Kinetic pumps, of radial vane, closed impeller construction. Substantially all of the Whirlpool pumps are driven by various types of induction motors, as is the case with most electric motor driven centrifugal pumps.

The biggest shortcoming with the above mentioned current devices is the inherent relative high cost of the motor. The size and, therefore, cost of the motor is inversely related to the motor speed. The higher the speed the smaller the size and the lower the cost. The maximum motor speed on normal household A.C. current is 3600 RPM, based on an A.C. induction motor, with the minimum number (two) of motor poles and 60 cycles per second current frequency in the USA. Devices have been developed for induction type A.C. motors which can vary the cycle frequency (and therefore motor speed) up or down, however, this does not reduce, but rather increases the complexity and cost of the motor plus controls package.

Even when the motor speed (and therefore pump speed) is increased by means of a variable frequency device, there is a limit to the speed of a conventional centrifugal pump in Whirlpool or Spa applications due to cavitation in the inlet of the impeller vanes. This is why belt-driven submersible pumps powered by high speed universal motors are stepped down to about 3600 RPM today. Further, conventional universal motors are inherently noisy and must normally operate at very high speeds (over 10,000 RPM) to provide sufficient cooling for the power levels required with a fixed installation Whirlpool pump.

Additionally, the following patents were developed in searching the various features of the invention:

| Patent No. | Inventor |
| --- | --- |
| 4,661,041 | Hessler |
| 3,384,022 | Oshima |
| 4,019,829 | Knopfel et al. |
| 4,449,889 | Balje |
| 4,523,900 | Frey |
| 4,642,023 | Dunn |
| 4,213,742 | Henshaw |
| 4,389,159 | Sarvanne |
| 4,518,311 | Dernedde et al. |

-continued

| Patent No. | Inventor |
| --- | --- |
| 3,516,757 | Baumann |
| 4,126,360 | Miller et al. |
| 4,286,919 | Yamaguchi |
| 2,991,927 | Quick |
| 4,842,481 | Collins |
| 3,286,639 | Hutton |

Accordingly, the high speed pump for Whirlpool and Spa application of the invention overcomes the limitations of the prior art devices.

SUMMARY OF THE INVENTION

An object of the invention is to provide an improved pump which operates at high speed.

According to the broader aspects of this invention, a series wound universal motor is used to power, thru a direct drive (close coupled), a high speed centrifugal impeller, to speeds in the range of 4000 RPM to 9000 RPM, for Whirlpool and Spa applications. A universal motor is cheaper than a single speed, two speed or variable speed induction motor, due to the higher speed and subsequent smaller motor size. Also, variable speed is easily accomplished with a universal motor by just varying only the voltage to the motor, and variable speed is a desirable option in the Whirlpool and Spa market.

A feature of the invention is that the leading edge of the impeller vanes, extends forward along the axial portion of the front shroud, toward the incoming flow stream (impeller eye) to form a female "inducerpeller". The female inducerpeller portion of the impeller vane has an extensive sweep back angle to the incoming flow, approximately five to fifteen degrees to the impeller axis. Inducers (male and female) are known to improve pump suction performance and allow the pump to operate at high speeds without excessive cavitation (noise and/or damage). There are also impellers which extend the full impeller vanes axially into the impeller eye to form a male "inducerpeller" to achieve the same improved suction performance as a separate inducer with an impeller. The inventive inducerpeller only extends the portion of the vane attached to and near the front shroud into the impeller eye to form a female "inducerpeller". Cavitation normally starts where the leading edge of the impeller vane meets the front shroud. This achieves the required improved suction performance (for a high speed universal motor direct drive (in the 4000 RPM to 9000 RPM range) without increasing the cost or size of the pump, as would be required with a separate inducer, or operating the pump at slow speed. Although female inducerpeller vane extensions are known in the industrial pump industry, an inventive feature is its coupling with a universal motor driven pump for Whirlpool and Spa applications, and particularly with molded plastic impellers.

Another feature of the invention includes unique modifications to the motor fan to both reduce the motor noise level and increase motor cooling. The basic function of a motor cooling fan is to draw ambient air into the motor housing, thru the stator laminations, over the field coils, armature, commutator and brushes, while providing sufficient air currents to also cool the motor bearings. Fans of this type are well known to the motor industry, and for best cooling and noise they normally maximize the number of vanes on the fan to the point that additional full vanes will block air flow through the inlet portion of the fan. The fan according to the invention is more effective (quieter and better cooling) due to the application of splitter (short) vanes equally spaced between the normal full length fan blades, coupled with a reduction of the rear fan shroud diameter below the maximum blade outer diameter. The use of splitter vanes allows more blades/vanes to be used on the fan without blocking the air inlet to the fan. The higher number of blades/vanes reduces the pressure loading on the fan individual blades/vanes, which reduces the noise level, and increases the frequency of the motor noise which makes the noise easier to block. The reduction of the rear shroud reduces the blockage of the axial component of the air flow at the discharge of the fan, as it exits the motor housing vents with as little restriction as possible. The better cooling from this fan also allows a smaller outer fan diameter which further reduces the noise level.

A further feature of this invention includes a modification to the motor housing stationary "peeler" tongue which is close to the outer diameter of the fan blades/vanes. The peeler tongue has been skewed at an angle with respect to the fan blades to further reduce motor/fan noise. Without the skewing, the valving effect of the high and low pressure sides of each fan vane passing close to the peeler tongue causes strong pressure pulsations, or noise. By skewing the peeler tongue, this causes a more gradual fluctuation of the fan exit pressure as the fan blades pass close to the tongue, thus generating less noise.

An additional feature of this invention includes a multipurpose motor mounting foot which supports the motor and indirectly the pump, encloses a cavity in the bottom of the motor for mounting electrical control board while maintaining double insulation integrity and sound deadening between motor and motor foundation. The above functions are achieved by use of an elastomeric material mounting foot. Most motors have metal or hard plastic mounting feet with only one function.

Yet another feature of this invention is the two step front impeller seal wear ring (surface) construction to reduce the recirculation leakage flow into the pump suction. Not only does this increase pump efficiency but it improves the suction performance of the pump. This coupled with the described inducerpeller above, permits the pump to be operated at high speeds. Although, two step front impeller seal wear ring (surface) construction is known for use with industrial pumps, an inventive feature is its use with universal motor driven pumps in the Whirlpool and Spa applications, especially when coupled with the female inducerpeller vane extensions previously discussed.

A still further feature of this invention is a unique combination of mechanical seal components which permit dry running of the mechanical seal to speeds up to 18,000 RPM. This feature is achieved by using a rotating ceramic component on the back side of a plastic impeller, which has a metal band around the outer circumference. This metal band dissipates a sufficient amount of heat to allow the seal and impeller to survive for hours when run dry at these high speeds. This is even a bigger problem with universal motors, since they speed up when unloaded.

Also, a feature of this invention includes a unique method of housing the variable speed controls, so that a separate enclosure will not be required for the speed control elements. This adds to the low cost of the design. Other variable speed control devices for Whirlpool and Spa application require separate enclosures. This inventive feature is achieved by adding an electrical compartment to the belly of the motor, covered by the motor mounting foot for mounting a control PC board. Another control PC board may be mounted in the rear of the motor on the rear motor compartment cover for heat dissipation.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 3 is a frontal view of the fan according to the invention;

FIG. 3A is a cross-sectional view taken along arrows A—A of FIG. 3;

FIG. 5 is an example of voltage control means for the universal motor.

DETAILED DESCRIPTION OF THE PREFERRED EMBODIMENT

Figure 1:
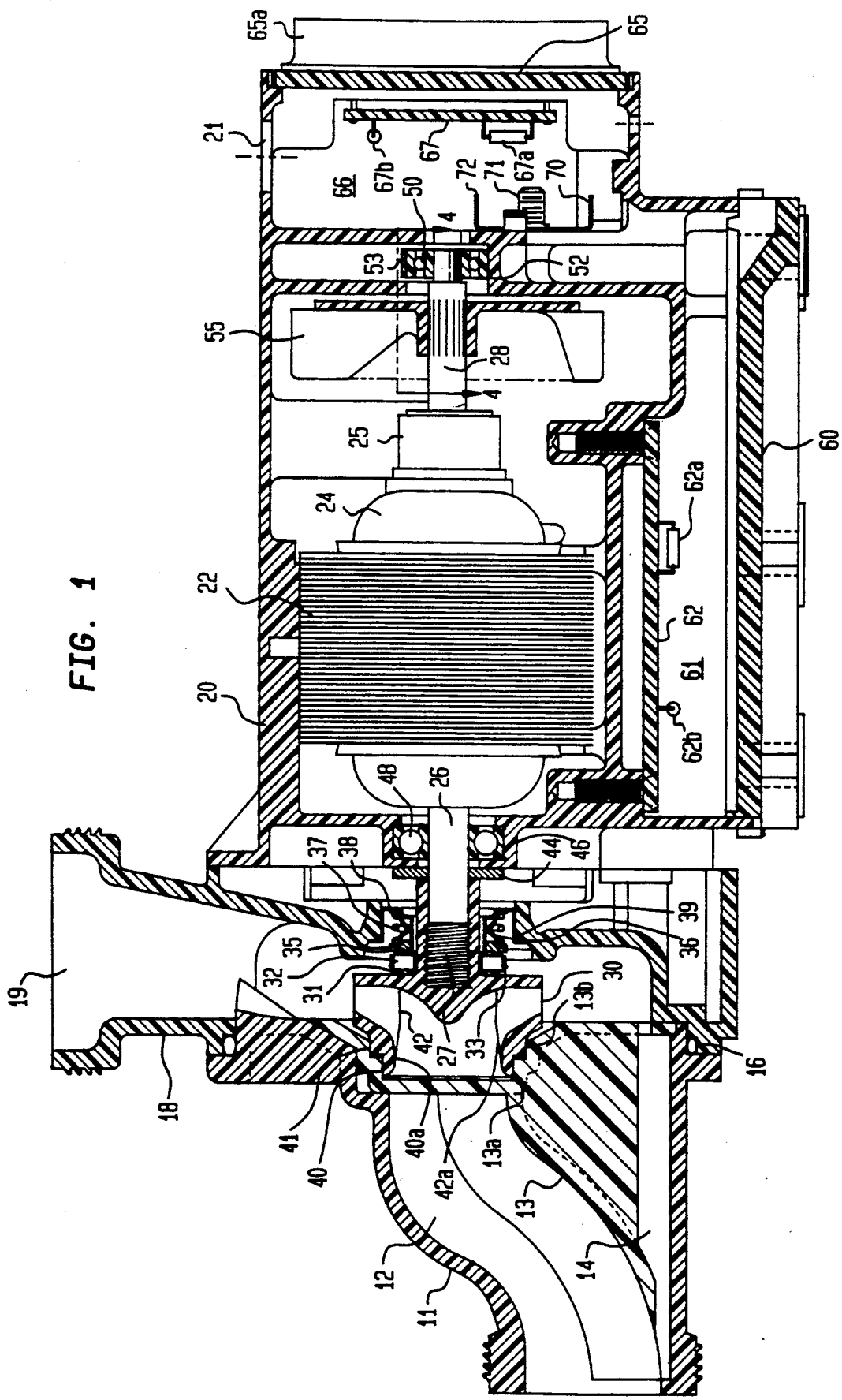
FIG. 1 is a cross-sectional view of the pump according to the invention.

The pump apparatus of the invention will best be understood by reference to FIG. 1. As illustrated, the apparatus includes a suction cover 11, suction inlet 12, insert 13, and self-draining channel 14. A O-ring 16 is positioned between cover 11 and casing 18 having an outlet 19. Cover 11 and casing 18 are mounted to universal motor housing 20 by self taping screws in a standard manner. The universal motor includes a stator 22 and an armature 24. The armature 24 includes a commutator 25, and a shaft 26 having a threaded end 27 and a splined end 28. The commutator brushes for the universal motor are located in the housing 20 in a plane perpendicular to the cross-sectional view.

Threaded on shaft 27 is an inducerpeller 30 having mounted thereon a rubber boot 31, ceramic ring 32, and metal retaining ring 33 which form part of a mechanical seal. The other part of the mechanical seal includes a carbon seal ring 35, rubber boot 36, spring 37, and retaining cup 38. An O-ring 39 is positioned between cup 38 and casing 18. Inducerpeller 30 has two step front surfaces 40,41 which run with a clearance between the complementary inner surfaces 13a,13b of insert 13 to provide an impeller seal wear ring surface to reduce recirculation leakage flow into the pump suction. The inducerpeller has a vane 42 with a vane portion 42a which extends forward along the axial portion of the front shroud 40a, and sweeps back an angle of approximately 5° to 15° to the impeller axis to improve suction performance.

A slinger 44 is mounted on shaft 26 adjacent bearing hub 46 of housing 20. Bearings 48, rotatably mount shaft 26 in hub 46, and bearings 50 rotatably mount the splined end 28 to housing bearing surface 52, and bearing 50 is retained on housing bearing surface 52 by means of strap 53. A fan 55 is spline mounted on the spline end 28 of shaft 26.

An elastomeric motor mounting foot 60, encloses a compartment 61, in which may be mounted a circuit board 62 for mounting electrical components 62a,b for motor speed control. Back plate 65 encloses another compartment 66 in which may be mounted another circuit board 67 for mounting other of the electrical components 67a,b to control motor speed. Terminals 70,71,72 are used to connect leads to and from circuit boards and power source. Power leads (not shown) are coupled through opening 21 in housing 20 in known manner. Back plate 65 may be metal to facilitate heat transfer through fins 65a from circuit board 67 which may be the high power circuit board of the control requiring the most heat dissipation.

In the preferred embodiment, cover 11, insert 13, casing 18, housing 20, inducerpeller 30, fan 55, and mounting foot 60 are made of plastic suitable for injection molding.

Figure 2:
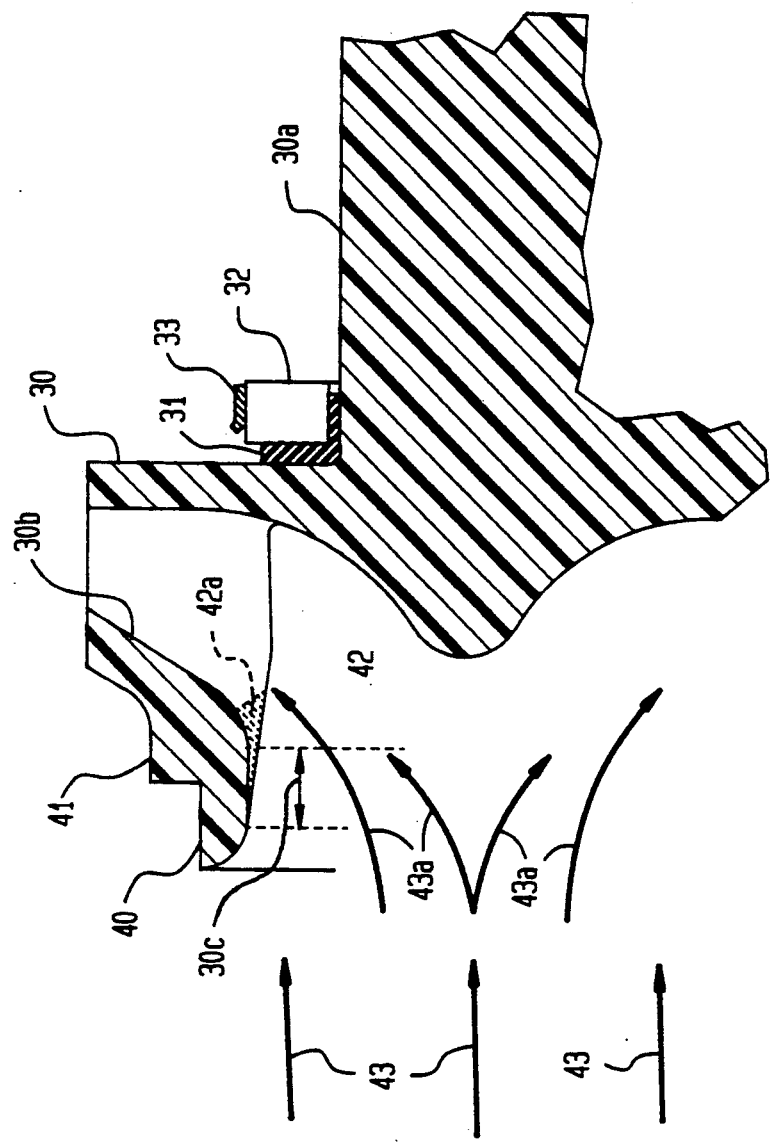
FIG. 2 is an enlarged partial sectional view showing the inducerpeller of the invention.

Referring now to FIG. 2, an enlarged partial sectional view shows the inducerpeller 30 of FIG. 1. The impeller 30 has mounted on its hub 30a, a rubber boot 31, a ceramic ring seal component 32, and a metal seal band 33. The metal band dissipates sufficient heat to allow the seal and inducerpeller to run dry for a number of hours at high speeds. The front shroud 30b has stepped front surface wear ring surfaces 40,41. The vane 42 has a leading edge portion (shown in shaded lines) 42a which flows smoothly into the axial impeller eye portion 30C and sweeps backward at angle of approximately 5°–15° to the axis of the inducerpeller. The leading edge portion facilitates smooth fluid flow transition represented by arrows 43 to 43a.

FIGS. 3 and 3A further illustrate the motor fan according to the invention. The fan 55 includes thirteen full length blades 55a, thirteen short (splitter) vanes 55b, a hub 55c for pressing onto splined shaft, and a rear fan shroud 55d. The rear fan shroud 55d has a diameter 55e which is less than the diameter 55f. As described in the Summary of the Invention, the splitter vanes equally spaced between the full length blades improves the effective cooling, and the reduced shroud diameter improves the air flow at the discharge of the fan as it exits the motor housing.

Figure 4A:
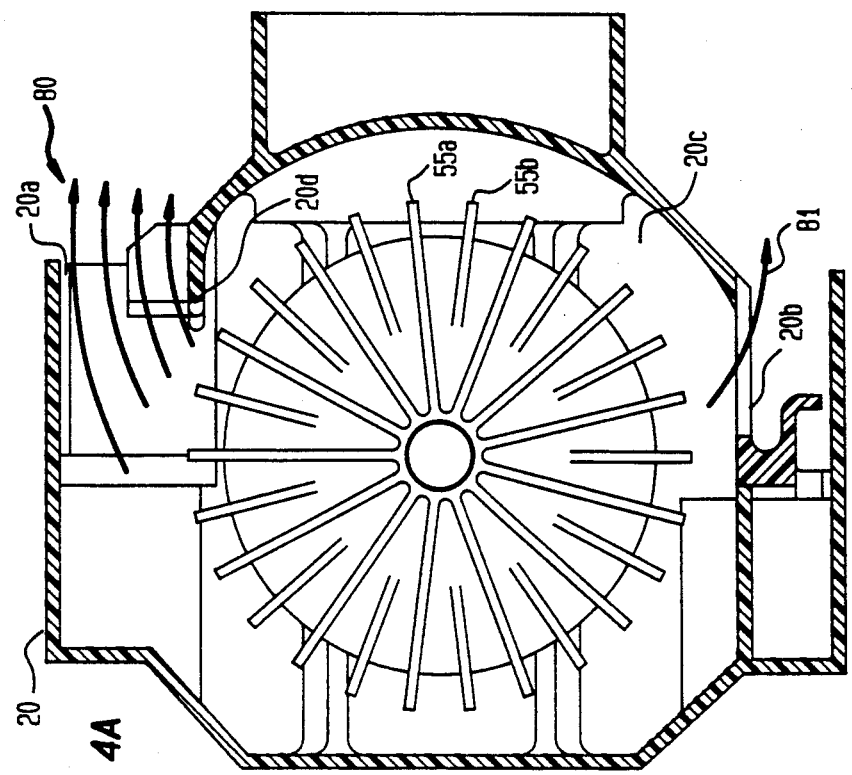
FIG. 4A is a cross-sectional view showing the motor housing vents, peeler tongue and fan taken along arrows A—A of FIG. 4.
Figure 4B:
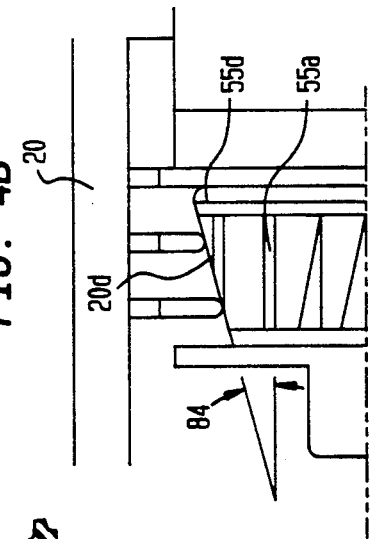
FIG. 4B is a partial view showing the fan and peeler tongue taken along line B—B of FIG. 4.
Figure 4:
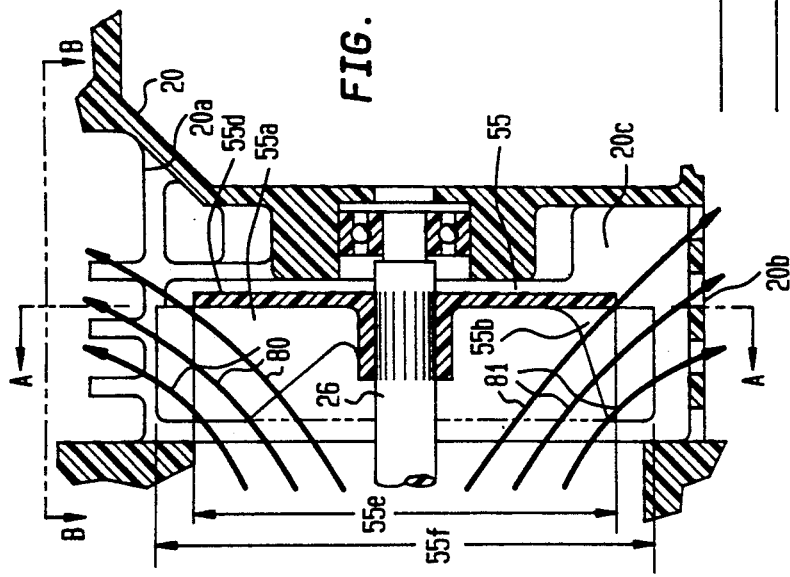
FIG. 4 is a partial cross-sectional showing the fan and housing vents taken along lines 4—4 of FIG. 1.
Figure 1:
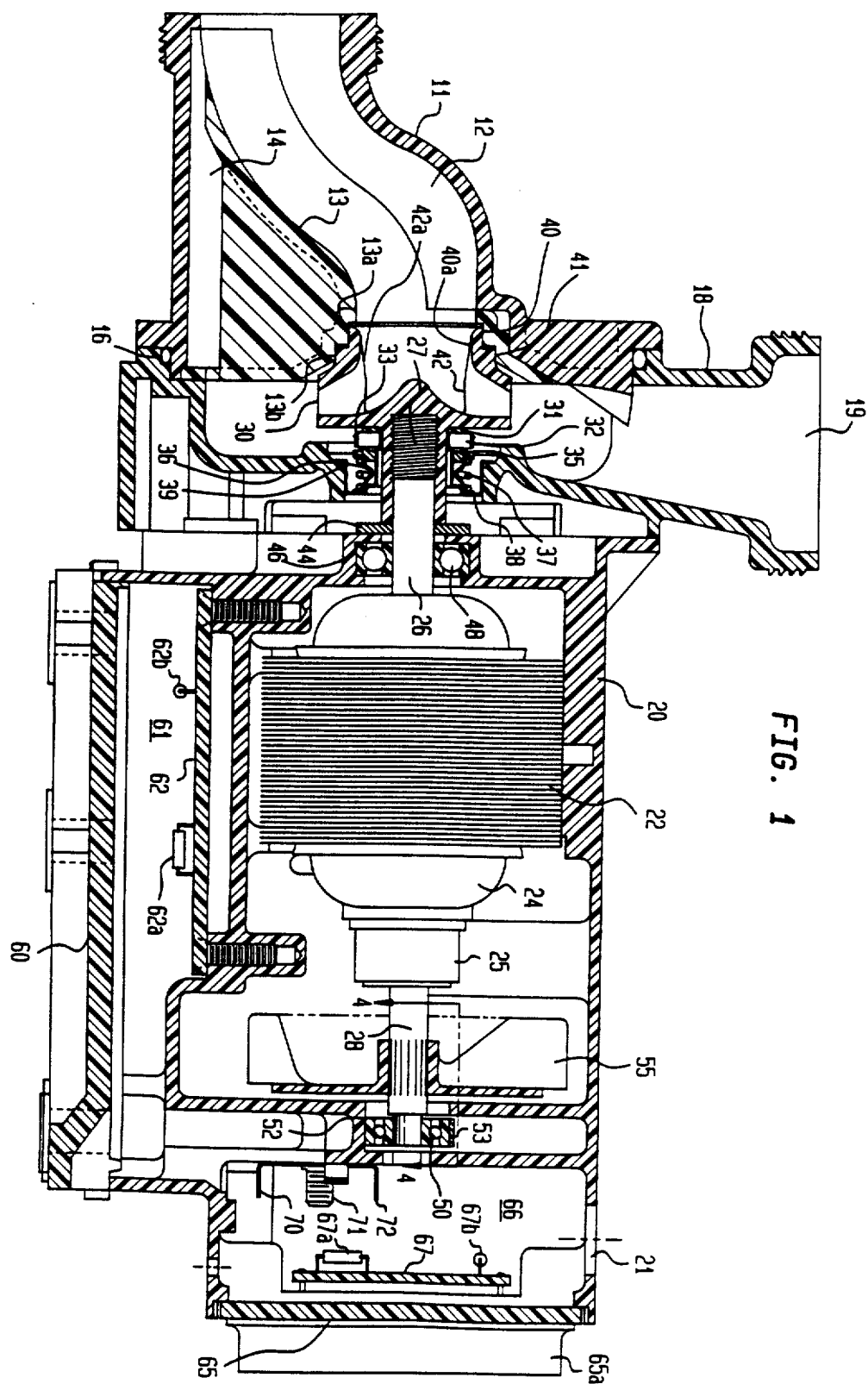

The fan features will be better understood by reference to FIG. 4 which is a partial cross-sectional view taken along lines 4—4 of FIG. 1 to show the effect of air flow through the fan and vents. Motor housing 20 has housing vents 20a, 20b for air exhaust from fan 55. Rear fan shroud 55d has a diameter 55e shorter than the outer diameter 55f to facilitate air flow represented by arrows 80,81 to the exhaust vents throughout the fan compartment 20c. In FIG. 4A, a peeler tongue 20d is shown in vent 20a close to the outer diameter of the fan blades/vanes, and as shown in FIG. 4B, the motor housing 20 peeler tongue 20d is skewed at an angle 84 of approximately fifteen degrees with respect to the fan blades 55a to further reduce motor/fan noise. Without skewing, the high and low pressure sides of the blades/vanes cause higher pressure pulsations or increased noise.

Referring now to FIG. 5, a series wound universal motor UV is normally controlled by a voltage control means 90 which is connected between the voltage source, for example, 115 volts, 60 cycles, and the motor leads. Although the specific type voltage control means is not the subject to this invention, it is well known that the voltage controls means function could be accomplished by an on-off switch 91, and a voltage variac 92 which would vary the incoming voltage and thus the speed of the motor. In the preferred embodiment of the invention the series wound universal motor would have stator and armature winding to enable operation in the range of 4000 to 9000 RPM which is desirable for the Whirlpool and Spa applications.

While the present invention has been disclosed in connection with a preferred embodiment thereof, it should be understood that there may be other embodiments which fall within the spirit and scope of the invention as defined by the following claims.

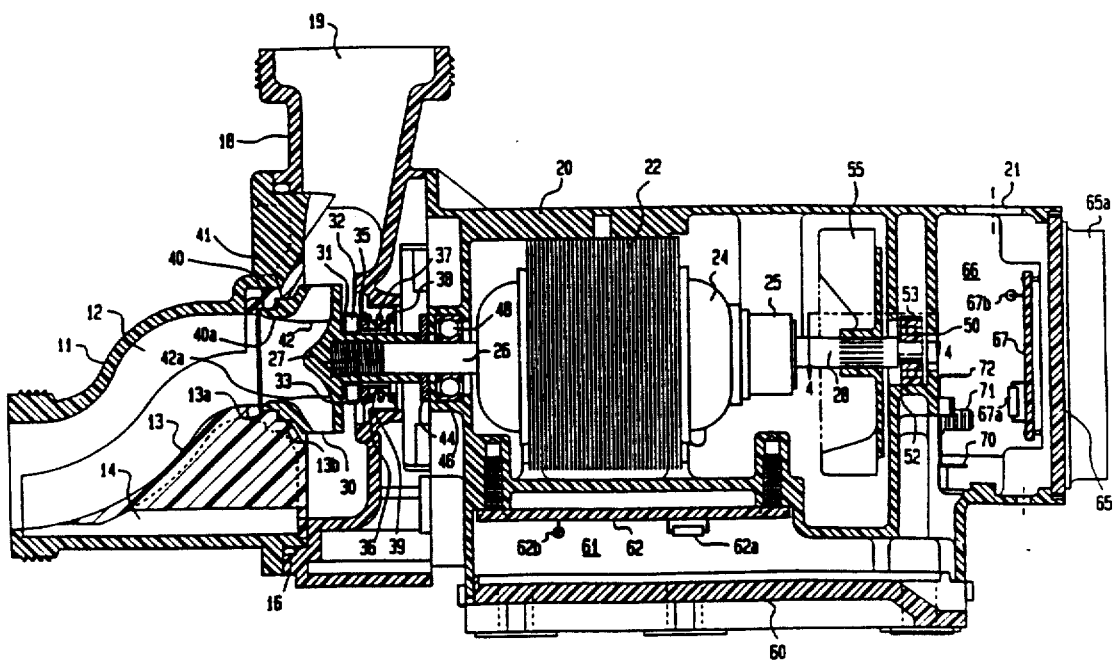

What is claimed is:

1. In combination:
   a universal motor including a motor housing and a motor shaft having an end extending axially from one end of said motor housing;
   a pump housing being mounted to said one end of said motor housing and forming a chamber;
   an impeller being mounted on said one shaft end for rotation within said chamber; and
   said motor housing includes a vent having a skewed peeler tongue adjacent the outer diameter of said fan blades and vanes, and said peeler tongue is formed at an angle of approximately fifteen degrees with respect to the axis of one of fan blades.

2. In combination:
   a universal motor including an injection moldable plastic motor housing and a motor shaft having an end extending axially from one end of said housing, and an extension on said housing opposite said one end forming a compartment;
   an injection moldable plastic self-draining pump housing being mounted to said one end of said motor housing and forming a chamber;
   an injection moldable plastic inducerpeller being mounted on said one shaft end for rotation within said chamber, said inducerpeller having vanes each of which extend forward to its axial eye portion and sweep backward therefrom toward the axis of said inducerpeller, and a two-step front seal wear ring surface which is displaced from a complementary surface in said pump housing;
   an injection moldable plastic fan mounted on another end of said shaft within said motor housing adjacent said compartment, said fan having alternating and equally spaced fan blades and splitter vanes cooperating with a vent in said motor housing having a skewed peeler tongue to reduce fan noise;
   component means being mounted in said compartment for controlling operating of said motor in the range of 4000 to 9000 RPM;
   rotating seal means including a ceramic seal and rubber boot mounted on a hub position of said inducerpeller and retained thereon by a metal band; and
   stationary seal means mounted in said pump housing for rotating contact with said rotating seal means.

3. In combination:
   a universal motor including a motor housing and a motor shaft having an end extending axially from one end of said motor housing;
   a pump housing being mounted to said one end of said motor housing and forming a chamber;
   an inducerpeller being mounted to said one shaft end for rotation within said chamber, said inducerpeller having vanes which extend forward into the axial portion of the eye forming the inducerpeller;

a motor fan mounted on another end of said shaft within said motor housing, said fan having alternating fan blades and splitter vanes, with splitter vanes equally spaced between full length fan blades, and a rear shroud having a diameter less than the outer diameter of the blades and vanes; and said motor housing includes a vent having a skewed peller tongue adjacent the outer diameter of said fan blades and vanes.

4. The combination of claim 3 wherein said peeler tongue is formed at an angle of approximately fifteen degrees with respect to the axis of one of fan blades.

5. A pump for Whirlpool and Spa applications having an inducerpeller operating in the range 4000 to 9000 RPM and comprising:
- a series wound universal motor including a motor housing and a motor shaft having an end extending axially from one end of said housing;
- a self-draining pump housing being mounted to said one end of said motor housing and forming a chamber;
- said inducerpeller being mounted on said one shaft end for rotation within said chamber, and said inducerpeller having vanes which extend forward to the axial portion of the eye of the inducerpeller;
- a fan mounted on another end of said shaft within said motor housing, said fan having alternating and equally spaced fan blades and splitter vanes; and
- said fan includes a fan shroud having an outer diameter that is less than the outer diameter of said fan blades and vanes, and said motor housing includes a vent having a peeler tongue adjacent the outer diameter of said fan blades and, vanes, said peeler tongue being formed at an angle of approximately fifteen degrees with respect to the axis of one of fan blades.

6. The pump of claim 5 including motor mounting foot means enclosing a compartment in said motor housing for mounting therein a motor control circuit boards; and
- a backplate enclosing another compartment in said motor housing for mounting therein another motor control means.

7. In combination:
- a universal motor including an injection moldable plastic motor housing and a motor shaft having an end extending axially from one end of said housing;
- an injection moldable plastic pump housing being mounted to said one end of said motor housing and forming a chamber;
- an injection moldable plastic inducerpeller being mounted on said one shaft end for rotation within said chamber, said inducerpeller having vanes which extend forward to its axial eye portion, and a two-step front seal wear ring surface which is displaced from a complementary surface in said pump housing;
- an injection moldable plastic fan mounted on another end of said shaft within said motor housing, said fan having alternating and equally spaced fan blades and splitter vanes;
- means for controlling operating of said motor in the range of 4000 to 9000 RPM;
- rotating seal means mounted on a hub position of said inducerimpellar;
- stationary seal means mounted in said pump housing for rotating contact with said rotating seal means; and
- said fan includes a fan shroud having an outer diameter that is less than the outer diameter of said fan blades and vanes; and said motor housing includes a vent having a peeler tongue adjacent the outer diameter of said fan blades and vanes.

8. The combination of claim 7 including injection moldable motor mounting foot means enclosing a compartment in said motor housing for mounting therein a motor control circuit board comprising a part of said controlling means; and
- a backplate enclosing another compartment in said motor housing for mounting therein another motor control circuit board comprising another part of said controlling means.

9. In combination:
- a universal motor including a motor housing and a motor shaft having an end extending axially from one end of said motor housing;
- a pump housing being mounted to said one end of said motor housing and forming a chamber; and
- an inducerpeller being mounted on said one shaft end for rotation within said chamber, said inducerpeller having vanes, each vane having a leading edge portion which flows smoothly into a portion of the axial impeller eye and sweeps backward at an angle of approximately 5 to 15 degrees to the axis of the impeller.

10. The combination of claim 9 wherein said inducerpeller includes a two-step front seal wear ring surface which is displaced from a complementary surface in said pump housing.

11. The combination of claim 9 including a motor fan mounted on another end of said shaft within said motor housing, said fan having alternating fan blades and splitter vanes, with splitter vanes equally spaced between full length fan blades, and a rear shroud having a diameter less than the outer diameter of the blades and vanes.

12. The combination of claim 9 including motor control means to operate said motor in the 4000 to 9000 RPM range.

13. The combination of claim 9 including rotating seal means mounted on a hub position of said inducerpeller; and
- stationary seal means mounted in said pump housing for rotating contact with said rotating seal means.

14. The combination of claim 13 wherein
- said rotating seal means includes a ceramic ring seal and a metal seal band for retaining said seal on said hub portion; and
- said stationary seal means includes a carbon ring seal.

15. The combination of claim 1 including an elastomeric motor foot mounting means enclosing a compartment in said motor housing for mounting therein a motor control circuit board.

16. The combination of claim 15 including a backplate enclosing another compartment in said motor housing for mounting therein another motor control circuit board, and said backplate including cooling fins for heat dissipation.

* * * * *

UNITED STATES PATENT AND TRADEMARK OFFICE
CERTIFICATE OF CORRECTION

PATENT NO. : 5,156,535

DATED : October 20, 1992

INVENTOR(S) : Allan R. Budris et al

It is certified that error appears in the above-identified patent and that said Letters Patent is hereby corrected as shown below:

The title page should be deleted to appear as per attached title page.

Figure 1 should be deleted to be replaced with fig.1 as shown on the attached sheet.

Signed and Sealed this

Twenty-third Day of November, 1993

Attest:

BRUCE LEHMAN

Attesting Officer        Commissioner of Patents and Trademarks

United States Patent

Budris et al.

[11] Patent Number: 5,156,535
[45] Date of Patent: Oct. 20, 1992

[54] HIGH SPEED WHIRLPOOL PUMP

[75] Inventors: Allan R. Budris, Parsippany; William D. Hessler, Wyckoff; Ramesh M. Patel, Ringwood; Shmariahu Yedidiah, West Orange, all of N.J.

[73] Assignee: ITT Corporation, New York, N.Y.

[21] Appl. No.: 607,179

[22] Filed: Oct. 31, 1990

[51] Int. Cl.⁵ .......... F04D 1/00; F04D 29/10; F04D 29/24; F04D 29/44
[52] U.S. Cl. .......... 417/423.7; 277/96.2; 415/119; 415/172.1; 415/206; 415/231; 416/185; 417/423.11; 417/423.8
[58] Field of Search ...... 417/423.1, 423.7, 423.8, 417/423.11, 423.14; 416/183, 184, 185, 186 R; 415/172.1, 228, 206, 119, 231; 277/96.2

[56] References Cited

U.S. PATENT DOCUMENTS

| | | | |
|---|---|---|---|
| 3,013,501 | 12/1961 | Ygge | 415/228 X |
| 3,017,071 | 1/1962 | Lejk et al. | 415/231 X |
| 3,272,129 | 9/1966 | Leopold | 416/183 X |
| 3,478,689 | 11/1969 | Ball | 417/423.11 X |
| 3,594,102 | 7/1971 | Oden | 417/423.11 |
| 3,644,067 | 2/1972 | Yowell | 417/423.11 X |
| 3,652,183 | 3/1972 | Pottharst, Jr. | 277/96.2 X |
| 3,914,072 | 10/1975 | Rowley et al. | 417/423.11 |
| 4,195,473 | 4/1980 | Aspinwall | 416/183 X |
| 4,597,717 | 7/1986 | Mohr | 417/265 |
| 4,647,271 | 3/1987 | Nagai | 416/186 R |
| 4,759,272 | 7/1988 | Zaniewski | 416/185 |
| 4,776,598 | 10/1988 | Akema | 277/96.2 |
| 4,998,865 | 3/1991 | Nakanishi | 417/423.146 |

FOREIGN PATENT DOCUMENTS

| | | | |
|---|---|---|---|
| 1075435 | 2/1960 | Fed. Rep. of Germany | 417/423.11 |
| 503046 | 2/1976 | U.S.S.R. | 416/185 |

Primary Examiner—Leonard E. Smith
Attorney, Agent, or Firm—Menotti J. Lombardi

[57] ABSTRACT

A pump for Whirlpool and Spa applications has a series wound universal motor which is directly coupled to a centrifugal impeller for operation in the range of 4000 to 9000 RPM. Variable speed of the pump is easily accomplished with a universal motor by varying the voltage to the motor.

16 Claims, 4 Drawing Sheets